Nov. 18, 1952  H. G. CONWAY  2,618,478
LIQUID SPRING UNDERCARRIAGE
Filed Nov. 29, 1948
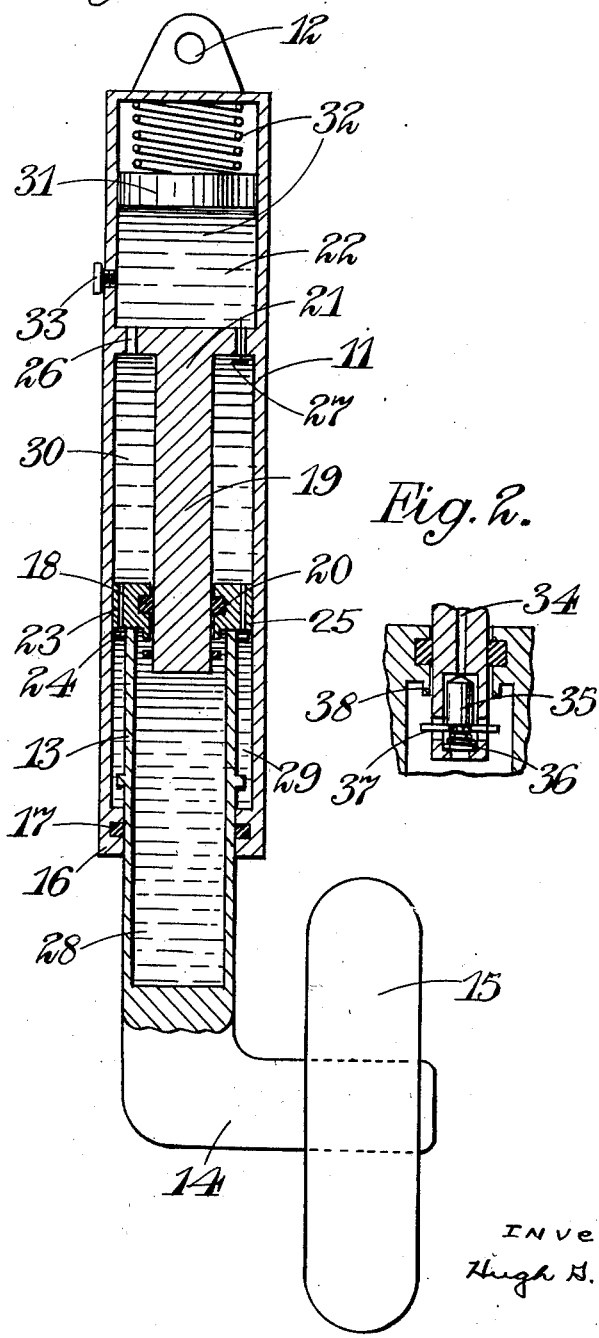
INVENTOR
Hugh G. Conway
By Watson, Cole, Grindle & Watson Patented Nov. 18, 1952

2,618,478

UNITED STATES PATENT OFFICE 2,618,478

LIQUID SPRING UNDERCARRIAGE

Hugh Graham Conway, Gloucester, England, assignor to Societe d'Inventions Aeronautiques et Mecaniques S. I. A. M., Geneva, Switzerland, a corporation of Switzerland Application November 29, 1948, Serial No. 62,567
In Great Britain June 5, 1947

6 Claims. (Cl. 267—64)

1

This invention comprises improvements in or relating to suspension systems and relates to suspension systems incorporating shock absorbers of the liquid-spring type.

There exist various arrangements of shock absorbers known as "liquid-spring" shock absorbers and the most common arrangement is constituted by a cylinder, inside which there slides a ram or piston with a piston-rod, which penetrates into the cylinder through a fluid-tight packing. The cylinder contains oil or a similar hydraulic fluid and during the action of the shock absorber the compression of the oil due to the penetration of the ram or piston-rod may produce pressures which are of the order of 3,000 to 4,000 kgs. per sq. cm. Consequently, the cylinder must be thick to withstand such pressures and therefore heavy.

According to the present invention a vehicle suspension, for example for aircraft, comprises a telescopic leg capable of being fixed rigidly for use to the body of a vehicle and a second telescopic member sliding relatively thereto and attached to the land wheel or its equivalent, characterised by the fact that the inner member of the telescopic pair of a part thereof constitutes the outer cylinder of liquid-spring type shock absorber having its ram or piston-rod extending within the outer telescopic leg. The use of the cylinder of the liquid spring as one sliding tube of the telescopic undercarriage has the advantage of saving one "tube" as compared with known constructions where a liquid spring is mounted independently of the undercarriage tubes and inside them. There are further constructional advantages which arise and which will be apparent from the more detailed description in the latter part of this specification.

Preferably, the liquid-containing cylinder telescopes into the interior of the upper telescopic member of the leg and is of such diameter as to leave an annular space between itself and the said upper member, which annular space is utilised as a rebound-control chamber.

The ram of the liquid spring may be supported by a diaphragm which spans the upper telescopic member, the space below and above the diaphragm containing liquid and the diaphragm being provided with restricted passages for the liquid so as to damp compression movements. Air may be contained under pressure within the leg above the diaphragm to assist in returning the liquid therethrough on rebound or the assistance may be provided by a spring urged piston within the leg above the diaphragm.

An aircraft undercarriage leg constructed according to the invention will now be described by way of example with reference to the accompanying drawings in which:

Figure 1 is a longitudinal section of an aircraft undercarriage leg incorporating a liquid-spring shock absorber according to the invention.

Figure 2 is a detail section through a filling valve of the leg shown in Figure 1.

The undercarriage comprises an outer cylindrical leg 11 which is pivoted at 12 to the structure of the aircraft it is intended to support and is provided with the usual connections to a retraction mechanism (not shown). When extended this mechanism holds the leg rigid with the body of the aircraft.

A tubular cylindrical member 13 telescopes into the upper portion of the leg from below and this cylindrical member at its lower end is formed into a laterally-projecting axle 14 for a ground wheel 15. The upper telescopic member of the leg is connected to the lower telescopic member by a pair of links (not shown) so as to prevent relative rotation about the axis of the cylindrical members as described in prior British Patent Specification No. 412,191.

The lower cylindrical telescopic member 13 is of smaller diameter than the bore of the upper cylindrical member 12 so that an annular space is left between these two members and this is closed at the lower end by an internally-directed flange 16 provided with a sealing ring 17 and at the upper end by a piston head 18 carried on the top of the lower cylindrical telescopic member. The piston head has a central bore which fits upon a ram 19 and the joint between the ram and the interior of the bore in the piston head is sealed by a ring packing 20.

The ram 19 projects downwardly into the lower telescopic member and it is held in fixed relation to the upper telescopic member by being secured at its upper end to a diaphragm 21 which spans the bore of the upper member. Above the diaphragm is a closed space 22.

The piston head 18 which surrounds the ram has passages 23 for liquid drilled through it into the annular space between the lower and upper telescopic members and on its underside it carries a ring-valve 24 which seats on damping apertures 25 of the passages 23 and tends to prevent liquid passing outwardly through said apertures when the shock-absorber is being extended.

The diaphragm 21 has also damping apertures 26 in it one or more of which may be closed against the passage of fluid outwardly through the diaphragm into the closed space 22 above it by means of non-return valves 27.

The cylindrical space 28 inside the lower telescopic member is filled with liquid so as to constitute a liquid spring. The annular space 29 between this member and the upper telescopic member, below the piston head, is also filled with liquid and the space 30 above the piston and below the diaphragm is also filled with liquid which extends through the openings in the diaphragm and partially fills the closed space 22 above it.

Above this liquid is a piston 31 urged downwardly by a spring 32.

In operation, on the wheel of the aircraft touching the ground, the lower telescopic member is compressed into the upper one. This movement of compression is resisted by the liquid trapped in the lower member of the leg and as this liquid completely fills the cylinder space 28 it constitutes a liquid spring. Inasmuch as the ram may be made of any diameter desired which is less than the diameter of the bore of the lower cylinder, the liquid spring may be given any degree of stiffness which may be desirable. The movement of compression is damped by forcing liquid out of the space above the piston head through the damping apertures into the closed chamber above the diaphragm. Liquid also flows at the same time through the passages 23 in the piston head and past the ring-valve 24 into the annular space 29 surrounding the lower telescopic member. The forcing of the liquid through the diaphragm raises the piston 31 and so compresses the spring 32 above it, and on rebound the spring and piston force the liquid out of the chamber through the apertures in the diaphragm and keep the space below filled with liquid. This rebound movement is positively controlled by the necessity for the passage of liquid through the damping apertures 25 in the piston head out of the annular space 29 and thus this annular space is used as a rebound-control chamber.

It will be noted that the liquid spring formed by the combination of the lower cylindrical member and the ram has no possibility of leakage except such liquid as may leak through the seal into the space 30 above the piston head, and as this space is filled with liquid the seal is lubricated by the liquid from both sides. A filling valve 33 is provided in the outer leg 11 which communicates with the chamber 22, and the liquid spring cylinder 28 is filled through a longitudinal duct 36 (Figure 2) in the ram leading from the chamber 22. The duct is provided at its lower end within the cylinder 28 with a valve member 35 which is seated to close the end of the duct during normal operation of the leg by means of a spring 36, but when the leg is extended to its fullest amount projections 37 upon the movable valve member engage abutments 38 upon the piston head 18 and cause the valve to open thus allowing the cylinder 28 to be filled with liquid.

This construction gives considerable flexibility to the designer in the choice of sections and areas for the two independent functions of springing and damping, in addition to the fact that the main seal is lubricated from both sides as already explained and that the two telescopic tubes which are required for the undercarriage leg are also used as operative elements of the shock-absorber.

I claim:

1. In a vehicle suspension, the combination of a telescopic leg comprising inner and outer tubular members slidable endwise with respect to one another, means for connecting one of said members to the body of a vehicle and the other to a ground contacting part, the inner tubular member containing a liquid chamber which has an opening at one end into the space within the outer member, a ram-rod secured within the outer member and extending into the liquid chamber through the opening, a liquid-tight seal around the ram-rod at the opening so that when the leg is telescoped the ram-rod slides into the liquid chamber and the liquid therein is compressed, and a partition spanning the interior of the outer member beyond the end of the inner member, the outer member containing damping liquid above and below the partition and the partition being provided with restricted passages therethrough to afford damping of the relative movement of the tubular members.

2. In a vehicle suspension, the combination of a telescopic leg comprising inner and outer tubular members slidable endwise with respect to one another, means for connecting one of said members to the body of a vehicle and the other to a ground contacting part, the inner tubular member containing a liquid chamber which has an opening at one end into the space within the outer member, a ram-rod secured within the outer member and extending into the liquid chamber through the opening, a liquid-tight seal around the ram-rod at the opening so that when the leg is telescoped the ram-rod slides into the liquid chamber and the liquid therein is compressed, and a partition spanning the interior of the outer member beyond the end of the inner member, the outer member containing damping liquid above and below the partition and the partition being provided with restricted passages therethrough to afford damping of the relative movement of the tubular members, and the inner tubular member having an external diameter smaller than the internal diameter of the outer member so that an annular liquid chamber exists between the tubular members, valve-means being disposed between, on the one hand, the liquid space within the outer member beyond said inner member and, on the other hand, the annular chamber between the members, said valve-means being arranged to permit ready flow of liquid into the annular chamber during compression of the leg, but restrict flow out of said chamber upon rebound.

3. In a vehicle suspension, the combination of a telescopic leg comprising inner and outer tubular members slidable endwise with respect to one another, means for connecting one of said members to the body of a vehicle and the other to a ground contacting part, the inner tubular member containing a liquid chamber which has an opening at one end into the space within the outer member, a ram-rod secured within the outer member and extending into the liquid chamber through the opening, a liquid-tight seal around the ram-rod at the opening so that when the leg is telescoped the ram-rod slides into the liquid chamber and the liquid therein is compressed, and a partition spanning the interior of the outer member beyond the end of the inner member, the outer member containing damping liquid above and below the partition and the partition being provided with restricted passages therethrough to afford damping of the relative movement of the tubular members, said passages having valve-means which operate to restrict flow of liquid through the partition more for one direction of flow than for the other direction.

4. In a vehicle suspension, the combination of a telescopic leg comprising inner and outer tubular members slidable endwise with respect to one another, means for connecting one of said members to the body of a vehicle and the other to a ground contacting part, the inner tubular member containing a liquid chamber which has an opening at one end into the space within the outer member, a ram-rod secured within the outer member and extending into the liquid chamber through the opening, a liquid-tight seal around the ram-rod at the opening so that when the leg is telescoped the ram-rod slides into the liquid chamber and the liquid therein is compressed, and a partition spanning the interior of the outer member beyond the end of the inner member, the outer member containing damping liquid above and below the partition and the partition being provided with restricted passages therethrough to afford damping of the relative movement of the tubular members, said passages having valve-means which operate to restrict flow of liquid through the partition more for one direction of flow than for the other direction, and the inner tubular member having an external diameter smaller than the internal diameter of the outer member so that an annular liquid chamber exists between the tubular members, further valve-means being disposed between, on the one hand, the liquid space within the outer member beyond said inner member and, on the other hand, the annular chamber between the members, said further valve-means being arranged to permit ready flow of liquid into the annular chamber during compression of the leg, but restrict flow out of said chamber upon rebound.

5. In a vehicle suspension, the combination of a telescopic leg comprising inner and outer tubular members slidable endwise with respect to one another, means for connecting one of said members to the body of a vehicle, and the other to a ground contacting part, the inner tubular member containing a liquid chamber which has an opening at one end into the space within the outer member and said inner tubular member also having an external diameter smaller than the internal diameter of the outer member so that an annular liquid chamber exists between the tubular members, a ram-rod secured within the outer member and extending into the liquid chamber within the inner member through the opening, a liquid-tight seal around the ram-rod at the opening, so that when the leg is telescoped the ram-rod slides into said liquid chamber and the liquid therein is compressed, a partition spanning the interior of the outer member beyond the end of the inner member, the outer member containing damping liquid above and below the partition and the partition being provided with restricted passages therethrough to afford damping of the relative movement of the tubular members, valve means disposed between, on the one hand, the liquid space within the outer member beyond the inner member and, on the other hand, the annular chamber between the members, said valve-means being arranged to permit ready flow of fluid into the annular chamber during compression of the leg but restrict flow out of said chamber upon rebound, a filling valve upon the outer tubular member communicating with the space within said outer member at the far side of the partition from the inner member, the ram-rod having a filling duct extending therethrough to place said space within the outer member and the liquid chamber within the inner member in communication for the purpose of filling said chamber, and a closure valve for the filling duct.

6. In a vehicle suspension, the combination of a telescopic leg comprising inner and outer tubular members slidable endwise with respect to one another, means for connecting one of said members to the body of a vehicle and the other to a ground contacting part, the inner tubular member containing a liquid chamber which has an opening at one end into the space within the outer member and said inner tubular member also having an external diameter smaller than the internal diameter of the outer member so that an annular liquid chamber exists between the tubular members, a ram-rod secured within the outer member and extending into the liquid chamber within the inner member through the opening, a liquid-tight seal around the ram-rod at the opening, so that when the leg is telescoped the ram-rod slides into said liquid chamber and the liquid therein is compressed, a partition spanning the interior of the outer member beyond the end of the inner member, the outer member containing damping liquid above and below the partition and the partition being provided with restricted passages therethrough to afford damping of the relative movement of the tubular members, valve-means disposed between, on the one hand, the liquid space within the outer member beyond the inner member and, on the other hand, the annular chamber between the members, said valve-means being arranged to permit ready flow of fluid into the annular chamber during compression of the leg but restrict flow out of said chamber upon rebound, a filling valve upon the outer tubular member communicating with the space within said outer member at the far side of the partition from the inner member, the ram-rod having a filling duct extending therethrough to place said space within the outer member and the liquid chamber within the inner member in communication for the purpose of filling said chamber, a closure valve for the filling duct, a valve spring to hold the closure valve shut during normal operation of the suspension, and projections upon the closure valve to engage a part of the inner tubular member and open the valve for filling when the leg is fully extended.

HUGH GRAHAM CONWAY.

REFERENCES CITED

The following references are of record in the file of this patent:

UNITED STATES PATENTS

| Number | Name | Date |
| --- | --- | --- |
| 1,918,698 | Gruss | July 18, 1933 |
| 2,197,474 | Johnson | Apr. 16, 1940 |
| 2,333,096 | Dowty | Nov. 2, 1943 |
| 2,342,381 | Thornhill | Feb. 22, 1944 |
| 2,346,667 | Dowty | Apr. 18, 1944 |
| 2,443,587 | Tack | June 15, 1948 |